United States Patent Office 2,918,472
Patented Dec. 22, 1959

2,918,472
5-METHYL, 4-AMINO-3-ISOXAZOLIDONE

Frederick W. Holly, Cranford, and Charles H. Stammer, Clark, N.J., assignors to Merck & Co., Inc., Rahway, N.J., a corporation of New Jersey No Drawing. Original application December 23, 1954, Serial No. 477,392, now Patent No. 2,840,565, dated June 24, 1958. Divided and this application May 31, 1957, Serial No. 662,563

2 Claims. (Cl. 260—307)

This invention relates to novel chemical compounds and particularly to 4-amino-3-isoxazolidone and its derivatives, and to processes for preparing these compounds.

This application is a division of our copending application Serial No. 477,392, filed December 23, 1954, now Patent No. 2,840,565.

In accordance with the invention it has been found that 4-amino-3-isoxazolidone compounds can be synthesized by reactions indicated as follows:

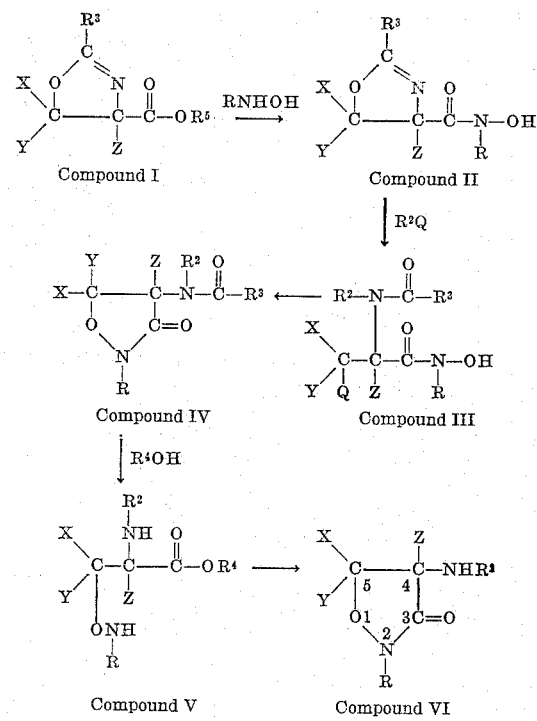

In the above formulae X, Y, and Z are hydrogen or alkyl, aralkyl or aryl groups containing from one to eight carbon atoms and may be the same or different groups; R and $R^2$ are hydrogen or alkyl or aralkyl groups containing from one to eight carbon atoms and may be the same or different groups; $R^3$ is an alkyl, aryl, or aralkyl group containing from one to eight carbon atoms $R^4$ and $R^5$ are alkyl groups containing from one to eight carbon atoms and may be the same or different groups, and Q is a bromo, chloro, or iodo group.

The reactions indicated are conducted as follows: a 4-carboalkoxy-2-oxazoline compound (Compound I) is reacted with a hydroxylamine in the presence of a base to produce a 4-carbohydroxamido-2-oxazoline compound (Compound II). This latter compound is then reacted with an ionizable halide compound to form a β-halo-propionohydroxamic acid compound (Compound III) which when treated with a base cyclizes to form a 4-amido-3-isoxazolidone compound (Compound IV). This compound is then reacted with an alcohol under acidic conditions to produce an α-amino-β-aminoxypropionate compound (Compound V) which is treated with a base to form a 4-amino-3-isoxazolidone compound (Compound VI).

The 4-carbohydroxyamido-2-oxazoline compound is prepared by reacting a 4-carboalkoxy-2-oxazoline compound having the general formula:

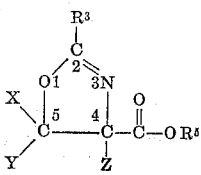

wherein X, Y, Z, $R^3$, and $R^5$ are as defined above, with a hydroxylamine in the presence of a base. Typical examples of such 4-carboalkoxy-2-oxazoline compounds are 2-phenyl-4-carbomethoxy-2-oxazoline; 2 - phenyl - 4 - carbethoxy-2-oxazoline; 2 - methyl-4-carbomethoxy-2-oxazoline; 2-methyl-4-carbethoxy-2-oxazoline; 2-phenyl-4-carbomethoxy - 5 - methyl - 2 - oxazoline; 2 - phenyl - 4 - carbethoxy-5-methyl-2-oxazoline; 2-phenyl-4-carbomethoxy-4 - methyl - 2 - oxazoline; and 2 - phenyl - 4 - carbethoxy-4-methyl-2-oxazoline. The hydroxylamine is of the general formula RNHOH wherein R is as defined above. Typical examples of suitable hydroxylamines are hydroxylamine, methyl hydroxylamine, ethyl hydroxylamine, propyl hydroxylamine, and benzyl hydroxylamine. The reaction is preferably carried out under anhydrous or substantially anhydrous conditions and in a solvent for the reactants. Suitable solvents are methanol, ethanol, propanol, butanol, dioxane or other similar solvents. The base is preferably an alkali metal alkoxide, such as sodium butoxide, potassium butoxide, sodium ethoxide, and sodium phenoxide but other bases may be used, such as potassium hydroxide, sodium hydroxide, lithium hydroxide and the like. The reaction temperature is not critical but it is preferred that it be at or below 30° C. and most preferably at about 0 to 15° C. The product may be precipitated by partially concentrating and acidifying the reaction mixture by the addition of a mineral acid. Examples of suitable acids are hydrochloric acid, hydrobromic acid, sulfuric acid and the like. Typical examples of 2-oxazoline-4-carbohydroxamido compounds which may be produced are 2-phenyl-4-carbohydroxamido-2-oxazoline; 2 - methyl-4-carbohydroxamido-2-oxazoline; 2-phenyl-4-carbohydroxamido-5-methyl-2-oxazoline; 2-phenyl-(N-methylcarbohydroxamido)-2-oxazoline.

The 4-carbohydroxamido-2-oxazoline compound is reacted with an ionizable halide compound having the general formula $R^2Q$ wherein $R^2$ is as defined above. The ionizable halide is a compound wherein the halide atom has a molecular weight greater than 30, which includes a chloride, bromide and iodide. Typical examples of such compounds are hydrogen chloride, methyl chloride, benzyl chloride, and ethyl chloride. The reaction is preferably carried out in an inert anhydrous solvent, such as an ether, or aromatic hydrocarbon. Typical examples of such solvents are benzene, toluene, dioxane, propyl ether, and methyl ethyl ether. The temperature of the reaction is preferably above 60° C. The mixture can be filtered hot to remove any insoluble material and then evaporated in vacuo to crystallize the product. The product may then be purified by dissolving in an alcohol, such as isopropanol, propanol, butanol, or ethanol, preferably a hot alcohol, and then precipitated by the addition of a non-solvent, such as a low-boiling petroleum ether. Typical examples of the β-halopropionohydroxamic acid compound are α-benzamido-β-chloropropionohydroxamic acid; α - benzamido - β - bromopropionohydroxamic acid; α-benzamido-β-iodopropionohydroxamic acid; α-acetamido-β-chloropropionohydroxamic acid; α-acetamido-β-bromopropionohydroxamic acid; α-acetamido-β-iodopropionohydroxamic acid; α-(N-benzylbenzamido)-β-bromopropionohydroxamic acid; α-(N-benzylbenzamido)-β-iodopropionohydroxamic acid; α-benzamido-β-chloro-N-methylpropionohydroxamic acid; α-benzamido-β-bromo-N-methylpropionohydroxamic acid; α-benzamido-β-iodo-N-methylpropionohydroxamic acid; α-benzamido-β-chlorobutyrohydroxamic acid; α-benzamido-β-bromobutyrohydroxamic acid; and α-benzamido-β-iodobutyrohydroxamic acid.

The β-halopropionohydroxamic acid compound is treated with a base to cyclize the compound to form a 4-amido-3-isoxazolidone compound. The base is preferably a water-soluble base, such as one of the alkali metal hydroxides. Other bases may be used, however, such as alkali metal alkoxides, such as sodium methoxide, potassium ethoxide, sodium ethoxide, or sodium propoxide. The reaction is preferably carried out in a solvent such as any water-soluble alcohol or ether, as for example, ethanol, n-propanol, tetrahydrofuran or dioxane. The reaction proceeds most favorably at a temperature of about 20° C. to about 100° C. The product is isolated by the addition of a mineral acid, such as hydrochloric acid, hydrobromic acid, or sulfuric acid and extraction into a water-immiscible solvent, as for example, chloroform, methylene chloride, benzene, or ether. The organic extract is then concentrated and allowed to cool with formation of the crystalline product. The 4-amido-3-isoxazolidone compound thus prepared has the general formula:

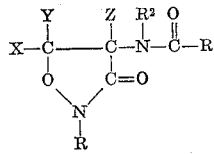

wherein X, Y, Z, R, $R^2$, and $R^3$ are as defined above. Typical examples of these compounds are 4-benzamido-3-isoxazolidone; 4-acetamido-3-isoxazolidone; 4-benzamido-5-methyl-3-isoxazolidone; 4-(N-benzylbenzamido)-3-isoxazolidone; and 2-methyl-4-benzamido-3-isoxazolidone.

The α-amino-β-aminoxypropionate compound is prepared by reacting the 4-amino-3-isoxazolidone compound with an alcohol under acidic conditions to produce the α-amino-β-amino-propionate compound. The alcohol has the general formula $R^4OH$ wherein $R^4$ is a lower alkyl group. Examples of suitable alcohols are methanol, ethanol, and n-propanol. The reaction is preferably carried out under reflux and in the presence of a mineral acid such as hydrochloric acid, hydrobromic acid or sulfuric acid. The product is isolated as the acid addition salt, which can be precipitated in crystalline form by the addition of a non-solvent for the material, such as chloroform or ether, to an organic solvent solution of the desired product. Typical examples of α-amino-β-aminoxypropionate compounds which can be prepared are β-aminoxyalanine methyl ester, β-aminoxyalanine ethyl ester; ethyl-α-amino-β-aminoxybutyrate, β-aminoxy-N-benzylalanine ethyl ester and β-(N-methylaminoxy)-alanine ethyl ester.

The α-amino-β-aminoxypropionate compound is treated with a base to form the corresponding 4-amino-3-isoxazolidone compound. This is accomplished by treatment with solution of organic bases such as methylamine, ethylamine, pyridine or quaternary amines, or inorganic bases such as alkali or alkaline earth metal hydroxides or carbonates or with ammonium hydroxide.

The base is preferably an aqueous solution of an alkali metal hydroxide of such concentration that the theoretical yield of product forms a 15% solution having a pH of 10 to 11. The product can be isolated by dilution of the solution with eight volumes of one part ethanol to one part isopropyl alcohol followed by filtration and acidification of the filtrate to pH 6.0 with glacial acetic acid. The 4-amino-3-isoxazolidone compound is recovered as the DL mixture which may be resolved to isolate the L form. Typical examples of 4-amino-3-isoxazolidone compounds are 4-amino-3-isoxazolidone; 4-amino-5-methyl-3-isoxazolidone; 4-(N-benzylamino)-3-isoxazolidone, and 2-methyl-4-amino-3-isoxazolidone.

The 4-amino-3-isoxazolidones are useful as bactericidal and/or bacteriostatic agents. They are also of value as growth promoting agents in animals. These compounds may also prove to be useful in topical application since they appear to have pronounced activity against a large number of both gram-positive and gram-negative bacteria. In this regard it should be noted that the DL-form of 4-amino-3-isoxazolidone has shown about ten times the activity of the D isomer against D. pneumoniae. The compounds are also useful for combatting bacterial disease in plants and trees.

The following examples are given for the purposes of illustration:

EXAMPLE 1

*Serine ethyl ester hydrochloride*

Three hundred and fifty grams serine (3.33 moles) was placed in a five-liter flask equipped with stirrer, thermometer, gas inlet tube, and a short air-cooled reflux condenser connected at its upper end with a water-cooled down condenser. Three thousand five hundred cubic centimeters anhydrous ethanol was added, then hydrogen chloride gas was passed into the suspension until the solid had dissolved and the temperature reached 70° C. The addition of hydrogen chloride gas was then stopped, external heat was applied and the reaction mixture was distilled at such a rate that 500 cc. distillate was collected in one hour. Five hundred cubic centimeters fresh anhydrous ethanol was added and the distillation continued at the same rate for another hour. The reaction mixture was concentrated in vacuo to a stiff syrup, two liters of ether was added, then scratched and stirred unit crystallization was complete. After cooling at 0° C. overnight the crystals were collected, washed four times with 200 cc. anhydrous ether and dried in vacuo at 50–60° C. Yield 558 grams serine ethyl ester hydrochloride (99% of theory), melting point 94–97° C.

EXAMPLE 2

*Benzimido ethyl ether*

In a five-liter flask equipped with thermometer and gas inlet tube was placed 1248 grams (12.1 moles) benzonitrile and 605 grams (13.1 moles) absolute alcohol. The mixture was chilled to −10° C. and 515 grams (14.1 moles) hydrogen chloride gas was passed into the solution, allowing the temperature to go up to 25° C. The mixture was allowed to stand for 48 hours at room temperature cooling the first several hours as needed to keep the temperature below 30° C. The solid mass was transferred to an enamelled pail, one liter of ether was added, then a solution of 1500 grams potassium carbonate in three liters of water was cautiously added (pH 9). The organic layer was separated, washed with two times 500 cc. of water, dried over anhydrous sodium sulfate, filtered and washed with ether. The filtrate was made up to 5000 cc. with ether so that one liter contained 360 grams benzimido ether. The yield was practically quantitative.

EXAMPLE 3

*2-phenyl-4-carboethoxy-2-oxazoline*

One thousand six hundred and forty-four grams serine ethyl ester hydrochloride (9.7 moles) was dissolved in 970 cc. water in a ten-liter Morton flask, 2160 grams benzimido ethyl ether (14.5 moles) in ether (total volume six liters) was added, then stirred vigorously and rapidly for 24 hours. About 1500 cc. water was added to dissolve the ammonium chloride, then allowed to settle for ten minutes. The aqueous layer and the heavy interphase emulsion were filtered and the filter cake was washed two times with 500 cc. of ether; the ether washes were separated from the new clear aqueous layer which was discarded. The combined organic layers were washed three times with 1500 cc. of water and dried over anhydrous magnesium sulfate. The ether was distilled off in vacuo, then the excess benzimido ethyl ether was recovered by distilling at one millimeter up to a head temperature of 100° C. (internal temperature 135° C.). Only a few drops came over at this point. Recovered 565 grams benzimido ethyl ether. The crude, undistilled 2-phenyl-4-carbo-ethoxy-2-oxazoline weighed 1834 grams (86.5% of theory).

A sample was distilled in vacuo; there was practically no forerun and practically no residue; nearly all distilled at 138–141° C. per 0.5 millimeter (internal temperature 170–175° C.). Calcd. for $C_{12}H_{13}O_3N$: C, 65.75; H, 5.98; N, 6.39. Found: C, 66.18; H, 5.98; N, 6.82 $n_D^{25}=1.5396$.

EXAMPLE 4

2-phenyl-4-carbohydroxamido-2-oxazoline

Hydroxylamine hydrochloride (152.8 grams, 2.2 moles) was dissolved in 3.2 liters hot anhydrous ethanol, a solution of 52 grams sodium in 1000 cc. anhydrous ethanol was added, then chilled to 0° C. The solution was filtered into a 12-liter flask and the sodium chloride washed twice with 25 cc. portion of cold anhydrous ethanol. A cold solution of 438 grams (two moles) crude 2-phenyl-4-carboethoxy-2-oxazoline in 880 cc. anhydrous ethanol was added over a period of ten to twenty minutes to the cold hydroxylamine solution, the combined alcohol solutions were chilled to 0° C., then a solution of 46 grams sodium in 1400 cc. anhydrous ethanol was added over a period of 45 minutes at 0–2° C. with stirring. The mixture was stirred another two hours at 0–5° C., then allowed to stand overnight at room temperature. The reaction mixture was concentrated in vacuo to a thick slurry which was dissolved in four liters of water, the turbid solution was treated with ten grams Darco, which was filtered and washed with 50 cc. water. The combined filtrate and washes were chilled to 5° C., then 1028 cc. 2.02 N hydrochloric acid (2.08 moles) was added over a period of 15 minutes at 5–10° C. with stirring (pH about 7). The mixture was filtered at 5° C. the cake was washed seven times with 250 cc. of ice-water and air-dried at 50° C. until the moisture content was reduced to 0.2% or less. The average yield of four runs was 358 grams (88% of theory), melting point 176–177° C. Analyzed as is—calcd. for $C_{10}H_{10}O_3N_2$: C, 58.25; H, 4.89; N, 13.58. Found: C, 57.96; H, 4.98; N, 13.26.

A sample (60 grams) was dissolved in 3600 cc. of hot-methanol, treated with Darco (3 grams), filtered and chilled at 0° C. Yield 55.8 grams (93%), melting point 181–182° C.

EXAMPLE 5

DL-4-benzamido-3-isoxazolidone

Two hundred and six grams crude 2-phenyl-4-carbohydroxamido-2-oxazoline (one mole) was placed in a ten-liter Morton flask equipped with stirrer, thermometer and one-liter dropping funnel, 2500 cc. dioxane was added followed by 2.5 cc. water, the suspension was heated to 95° C. with gentle stirring, then 1080 cc. dioxane containing 38.0 grams hydrogen chloride [1.04 mole, 0.035 gram hydrogen chloride per cc.] was added dropwise over a period of 100 minutes at 95–98° C. with very rapid stirring. ;The mixture was stirred another 15 minutes at 95–98° C. during which the reddish color changed to yellowish. The hot reaction mixture was sucked into a regular five-liter flask and concentrated in vacuo to a crystalline mush of an α-benzamido-β-chloropropionohydroxamic acid.

The residue was suspended in 2000 cc. water, warmed to 50° C. then 1060 cc. 1.98 N sodium hydroxide (84 grams sodium hydroxide, 2.1 moles) was added dropwise at 50–55° C. over a period of 70 minutes with stirring. The solution was chilled in brine to 10° C., 700 cc. 2 N hydrochloric acid was added (pH about 2), then extracted as rapidly as possible twice with two liters followed by five times with one liter of ethyl acetate. The combined extracts were warmed to 40° C.–45° C. to dissolve some crystalline matter, dried over magnesium sulfate, treated with ten grams Darco and filtered. The clear filtrate was concentrated in vacuo to about 1.5 liters (crystals began to appear early during the concentration). The concentrate was chilled to 0° C. overnight, the solid was filtered, washed three times with 80 cc. ice-cold ethyl acetate and air-dried at 50° C. Yield 108 grams first crop, melting point 164–167° C. The filtrate was concentrated to 250 cc. chilled at 0° C. overnight, filtered and washed three times with 20 cc. cold ethyl acetate; yield 20 grams second crop, melting point 159–163° C. After concentrating to 150 cc. and cooling, etc., a third crop of two grams was isolated, melting point 160–163° C. Total yield 130 grams crude DL-4-benzamido-3-isoxazolidone (63% of theory).

Five hundred and seventy grams crude product was treated with 25.6 liters hot ethyl acetate, suitably divided in 12-liter flasks, simmering the mixture on the steam bath for several minutes; the insoluble crystals (plates) exhibited a characteristic sheen. The hot mixture was allowed to cool to 55° C., then filtered at once. The insoluble material amounted to 50.6 grams (8.8%), melting point 160–163° C. The filtrate was chilled at 0° C. overnight (crystallization does not commence until room temperature is approached). The cottony crystal mass was filtered off, washed twice with 750 cc. ice-cold ethyl acetate and air-dried at 40–50° C. Yield 355 grams, melting point 170–171° C.

The combined filtrate and washings were concentrated in vacuo to about 4.3 liters, chilled at 0° C. overnight, filtered, washed twice with 150 cc. of ice-cold ethyl acetate and dried. Yield 121 grams, melting point 171–172° C. After concentrating in vacuo to 500 cc. chilling, etc., another crop of 16 grams crystals was obtained, melting point 168–169° C. Total yield of satisfactory material 492 grams (86.3%). Calcd. for $C_{10}H_{10}O_3N$: C, 58.25; H, 4.89; N, 13.58. Found: C, 58.38; H, 5.30; N, 13.30.

EXAMPLE 6

2-phenyl-4-carbohydroxamido-2-oxazoline

To a cooled solution of four grams (0.0575 mole) of hydroxylamine hydrochloride in 100 milliliters of absolute ethanol was added 35 milliliters of 1.82 N sodium methoxide (0.636 mole) in ethanol. After cooling the mixture to 0° C. the sodium chloride was filtered off, and a solution of ten grams (0.0515 mole) of 2-phenyl-4-carbomethoxy-2-oxazoline in 20 milliliters of ethanol was added to the filtrate. This solution was cooled to 0° C. and 25 milliliters of 1.82 N sodium methoxide (.0455 mole) was added slowly. The reaction mixture was allowed to stand well stoppered overnight. The solution was concentrated in vacuo to about 75 milliliters volume at room temperature. When about 100 milliliters of water was added to the solution, rapid and exothermic crystallization of what was probably the sodium salt of the oxazoline hydroxamic acid occurred. Further addition of water caused the solid to redissolve. To this solution 43.3 milliliters of 1.16 N hydrochloric acid (51.5 moles) was added dropwise with simultaneous crystallization of the product occuring. The white platelets of 2-phenyl-4-carbohydroxamido-2-oxazoline were filtered and after drying in a vacuum desiccator weighed 8.02 grams (75.5% yield), melting point 174–176° C. A recrystallized sample melted at 176–179° C. decomposed. *Analysis.*—Calcd.: C, 58.20; H, 4.88; N, 13.60. Found: C, 58.38; H, 5.05; N, 13.41.

EXAMPLE 7

α-Benzamido-β-chloropropionohydroxamic acid

To a mixture of four grams (.0194 mole) of 2-phenyl-4-carbohydroxamido-2-oxazoline and 50 milliliters of dry dioxane was added 44 milliliters of .46 N hydrogen chloride (0.0202 mole) in dry dioxane and the resulting mixture was heated on a steam bath for fifteen minutes (protected from moisture by a calcium chloride tube). During the heating period, the solution became pink and then colorless and the solid dissolved. The solution was filtered hot and evaporated in vacuo to a thick mass of crystals. These were dissolved in approximately 25 milliliters of hot isopropanol and 175 milliliters of low-boiling petroleum ether was added slowly to the solution. Crystallization occurred readily and after standing two days at 5° C., the solid α-benzamido-β-chloropropionohydroxamic acid, 4.40 grams, melting point 148–152° C., was filtered. A second crop weighed 0.184 gram, bringing the total yield to 93.5%. A small sample recrystallized from isopropanol petroleum ether melted at 153–155° C. *Analysis.*—Calcd.: C, 49.40; H, 4.56; N, 11.54; Cl, 14.6. Found: C, 48.94; H, 4.49; N, 11.77; Cl, 14.31.

EXAMPLE 8

4-benzamido-3-isoxazolidone

To a solution of 4.0 grams (0.0165 mole) of α-benzamido-β-chloropropionohydroxamic acid in about 30 milliliters of hot methanol was added dropwise from a burette 31.5 milliliters of 1.0 N sodium hydroxide (0.0315 mole). The solution was heated for a few minutes. It was then cooled, 4.2 milliliters of 1.16 N hydrochloric acid (.0165 mole) was added, and the solution was immediately extracted with one 100-milliliter portion and five 50-milliliter portions of chloroform. The combined chloroform extracts were concentrated to about 200-milliliters. Crystallization began and after the mixture was cooled, 2.07 grams of 4-benzamido-3-isoxazolidone, melting point 167–170° C., was collected on a filter. Another crop brought the crude yield to 2.54 grams (74.5%), and an analytical sample melted at 165–168° C. *Analysis.*—Calcd.: C, 58.24; H, 4.89; N, 13.59. Found: C, 58.45; H, 4.70; N, 13.37.

EXAMPLE 9

2-phenyl-4-carbohydroxamido-5-methyl-2-oxazoline

The procedure for the preparation of 2-phenyl-4-carbohydroxamido-5-methyl-2-oxazoline is the same as that described for the 2-phenyl-4-carbohydroxamido-2-oxazoline in Example 6. One hundred eighty-seven grams of oxazoline ester yielded one hundred forty-nine grams (79.2% yield) of the oxazoline hydroxamic acid, melting point 152–154° C. A sample recrystallized from isopropanol melted at 148–150° C. *Analysis.*—Calcd.: C, 59.99; H, 5.49; N, 12.73. Found: C, 59.98; H, 5.31; N, 12.91.

EXAMPLE 10

To a stirred refluxing solution of 9.6 grams (0.0435 mole) of 2-phenyl-4-carbohydroxamido-5-methyl-2-oxazoline in approximately 500 milliliters of dry dioxane (distilled from sodium three times) was added dropwise over a period of one hour 120 milliliters of dioxane containing 1.8 grams (0.0492 mole) of hydrogen chloride. During the addition of the hydrogen chloride solution, the reaction mixture became pink and a small quantity of a flocculent precipitate appeared. The solution was cooled, treated with Darco G-60 and filtered. The residue obtained from lyophilization of the filtrate was extracted with one 400-milliliter and three 50-milliliter portions of boiling ethyl acetate and the combined extracts diluted with an equal volume of chloroform. On cooling this solution, 6.58 grams (0.0256 mole, 58.8% yield) of α-benzamido-β-chlorobutyrohydroxamic acid, melting point 139–143° C., was obtained. A sample recrystallized from chloroform melted at 141–142.5° C. The ethyl acetate insoluble portion of the residue was apparently unrearranged oxazoline hydrochloride. *Analysis.*—Calcd.: C, 51.47; H, 5.10; N, 10.89; Cl, 13.81. Found: C, 51.72; H, 5.40; N, 10.94; Cl, 13.72.

EXAMPLE 11

4-benzamido-5-methyl-3-isoxazolidone

To a stirred slurry of 6.40 grams (0.025 mole) of α-benzamido-β-chlorobutyrohydroxamic acid in 100 milliliters of water heated to 65–75° C. was added in one hour sufficient (46 milliliters, 183%) .99 N sodium hydroxide to give a permanent phenol phthalein end point. The solution was cooled in an ice bath and to it 21.4 milliliters of 1.16 N (0.025 mole) hydrochloric acid was added. The acidic solution was extracted with five 250-milliliter portions of chloroform and the combined dried extracts concentrated to approximately 255 milliliters. The crystalline precipitate, 3.32 grams, melting point 188–194° C. was collected on a filter. The filtrate on concentration yielded another 1.02 grams, melting point 187–192° C., bringing the total yield to 4.34 grams (79%). A small sample recrystallized from chloroform melted at 187–190° C.

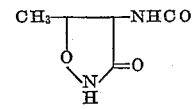

*Analysis.*—Calcd.: C, 59.99; H, 5.49; N, 12.72. Found: C, 59.62; H, 5.14; N, 12.56.

EXAMPLE 12

Methyl-α-amino-β-aminoxypropionate dihydrochloride

A solution of .500 gram (0.00242 mole) of 4-benzamido-3-isoxazolidone in 10 milliliters of dry methanol saturated with hydrogen chloride was refluxed for three hours. The reaction mixture was added to 50 milliliters of dry ether and a gummy precipitate which crystallized on standing was formed. The solid, weight .383 gram (yield 76.5%), melting point 133–140° C., was collected on a filter. Recrystallization of the crude methyl α-amino-β-aminoxypropionate dihydrochloride from ethanol gave material melting at 133–136° C. with resolidification occurring at 140–160° C., followed by decomposition at 165° C. *Analysis.*—Calcd.: C, 23.20; H, 5.83; N, 13.53; Cl, 34.24. Found: C, 21.50; H, 6.07; N, 13.53; Cl, 29.90. In a similar manner the ethyl ester is formed by refluxing with ethanol.

EXAMPLE 13

Methyl α-amino-β-aminoxybutyrate

A rapid stream of hydrogen chloride was passed into 250 milliliters of dry methanol for approximately forty minutes. To this solution was added five grams (0.0227 mole) of 4-benzamido-5-methyl-3-isoxazolidone and the solution refluxed in two hours. After removal of the methanol on an aspirator, the residue was pumped 48 hours to dryness. An attempt to dissolve the crystalline residue in 150 milliliters of boiling isopropanol left 2.11 grams (0.00953, 42%) of crystalline methyl α-amino-β-aminoxybutyrate dihydrochloride, melting point 139–145° C. *Analysis.*—Calcd.: C, 27.16; H, 6.38; N, 12.67; Cl, 32.07. Found: C, 27.44; H, 6.46; N, 12.46; Cl, 31.27.

EXAMPLE 14

DL-4-amino-3-isoxazolidone

A solution of .225 gram (.00109 mole) of methyl α-amino-β-aminoxyproprinate dihydrochloride in 4.0 milliliters of 1.0 N sodium hydroxide was allowed to stand for one-half hour. After addition of 1.6 milliliters of 1.16 N (.00183 mole) hydrochloric acid the solution was stirred for one-half hour with each of three ten-milliliter portions of the anion exchange resin, IRA–400 (basic cycle). The resin was then twice stirred with 50-milliliter portions of water while carbon dioxide was bubbled into the mixture. The aqueous extracts were combined and lyophilized to give .0275 gram (25%) of DL-4-amino-3-isoxazolidone having an indistinct melting point at about 121° C.

EXAMPLE 15

DL-4-amino-3-isoxazolidone

Two and seven one hundredths grams of methyl-α-amino-β-aminoxy-propionate dihydrochloride was dissolved in 12.0 milliliters of 2.51 N sodium hydroxide and the resulting solution diluted to 60 milliliters with distilled water. After standing at 25° C. for about ten minutes, the solution was dried from the frozen state to yield 2.60 grams of solid residue. A portion of this product weighing 0.97 gram was dissolved in 6 milliliters of water and brought to pH 11 with a few drops of aqueous potassium hydroxide. To the solution were added 25 milliliters and 12 milliliter-portions of isopropanol, and finally 15 milliliters of ethanol. The solution was chilled to 5° C. and adjusted to about pH 6 with glacial acetic acid. Crystals separated fairly promptly and were collected by filtration washed with isopropanol and ether and dried in vacuo to yield 74.5 milligrams of substantially pure DL-4-amino-3-isoxazolidone.

EXAMPLE 16

4-amino-3-isoxazolidone

A solution of 73.3 grams (0.332 mole) of β-aminoxy-alanine ethyl ester dihydrochloride in 100 milliliters of water was stirred in a 500 milliliter three-necked round-bottomed flask cooled in an ice bath. To the above solution was added over a thirty minute period 65.6 grams (1.17 moles) of potassium hydroxide dissolved in 100 milliliters of water. While the pH of the reaction mixture was 7–10.5, a red color appeared which disappeared when the pH reached 11–11.5. The light yellow solution was allowed to stand at room temperature for one-half hour and then added to 1800 milliliters of 1:1 ethanol-isopropanol. The reaction flask was washed twice with 10 milliliter portions of water and these washings added to the alcohol solution. The precipitated salts were filtered out of the alcohol solution and the filtrate cooled to 5° C. in a 5–1 three-necked round-bottomed flask. To the cold, well-stirred solution, was added dropwise over a 35-minute period sufficient glacial acetic acid to bring the pH of the alcohol solution to 6.0. When the pH of the solution had reached 7–7.5, the solution was seeded and no further acetic acid added until crystallization of the oil already precipitated had definitely begun. The crystalline precipitate was collected on a filter, washed twice with 1:1 ethanol-isopropanol and twice with ether. The yield of 4-amino-3-isoxazolidone was 22.7 grams.

EXAMPLE 17

Methyl-α-amino-β-aminoxybutyrate

A rapid stream of hydrogen chloride was passed into 250 milliliters of dry methanol for approximately forty minutes. To this solution was added five grams (0.0227 mole) of 4-benzamido-5-methyl-3-isoxazolidone and the solution refluxed for two hours. After removal of the methanol on an aspirator, the residue was pumped 48 hours to dryness on a vacuum pump. An attempt to dissolve the crystalline residue in 150 milliliters of boiling isopropanol left 2.11 grams (0.00953, 42%) of crystalline methyl-α-amino-β-aminoxybutyrate dihydrochloride, melting point 139–145° C. A small sample triturated with boiling isopropanol melted at 136–138°

C. *Analysis.*—Calcd: C, 27.16; H, 6.38; N, 12.67; Cl, 32.07. Found: C, 27.44; H, 6.46; N, 12.46; Cl, 31.27.

EXAMPLE 18

4-amino-5-methyl-3-isoxazolidone

To a cold solution of 2.0 grams (9.05 moles) of methyl-α-amino-β-aminoxybutyrate dihydrochloride in 2 milliliters of water was added dropwise a cold solution of 1.8 grams of potassium hydroxide in 2 milliliters of water. During the addition of the alkali solution, the reaction mixture became pink and then colorless as the pH reached 11. After removal of the supernatant solution from the precipitated potassium chloride, the precipitate was washed twice with 0.5 milliliter of water and these washings were combined with the supernatant solution. This solution was diluted with 40 milliliters of 1:1 ethanol-isopropanol solution, the resulting mixture filtered, and the precipitate washed with a small volume of the 1:1 alcohol solution. After cooling the filtrate to 0–5° C. it was acidified to pH 6.0 by the dropwise addition of glacial acetic acid. The crystalline precipitate was 4-amino-5-methyl-3-isoxazolidone, .923 gram (88% yield), melting point 160–165° C. Recrystallized 0.761 gram, melting point 170–173° C., of analytically pure product. *Analysis.*—Calcd.: C, 41.36; H, 6.94; N, 24.13. Found: C, 41.31; H, 6.68; N, 23.88.

EXAMPLE 19

L-4-amino-3-isoxazolidone L-tartrate

Three hundred milligrams (0.002 mole) of L-tartaric acid and 200 mg. (0.002 mole) of DL-4-amino-3-isoxazolidone are dissolved together with 1 ml. of water. Solution is obtained and the L-4-amino-3-isoxazolidone L-tartrate crystallized from the solution in a yield 142 mg. (57% of one isomer); melting point 165.5–166° C. (dec.); $[\alpha]_D^{24°\ C.}$ —41° C. (c., 0.7 in water).

EXAMPLE 20

4-amino-3-isoxazolidone

Five hundred milligrams of L-4-amino-3-isoxazolidone L-tartrate is dissolved in 10 ml. of water and chromatographed on a column (2 x 13 cm.) of Amberlite IR–120 resin on the sodium cycle. The liberated tartaric acid is washed out of the column as its sodium salt with water. The L-4-amino-3-isoxazolidone is then washed from the column with two percent ammonia water. The L-4-amino-3-isoxazolidone is obtained as an amorphous, hygroscopic solid by removal of the solvent under reduced pressure. The crude product is dissolved in 1 ml. of 3 N ammonium hydroxide, and the solution diluted with a mixture of 4 ml. of ethanol and 4 ml. of isopropyl alcohol. It is filtered and adjusted to pH 5.5–6.0 by the addition of a few drops of glacial acetic acid. The yield of product which crystallized from solution is 120 mg. (60%); $[\alpha]_D^{24°\ C.}$ +100° C. (c., 1.0 in water).

Any departure from the above description which conforms to the present invention is intended to be included within the scope of the claims.

What is claimed is:
1. DL-4-amino-5-methyl-3-isoxazolidone.
2. 4-amino-5-methyl-3-isoxazolidone.

References Cited in the file of this patent
UNITED STATES PATENTS

| | | |
|---|---|---|
| 2,772,280 | Peck | Nov. 27, 1956 |
| 2,772,281 | Holly et al. | Nov. 27, 1956 |
| 2,773,878 | Schull et al. | Dec. 11, 1956 |
| 2,789,983 | Harned | Apr. 23, 1957 |
| 2,794,022 | Runge | May 28, 1957 |
| 2,840,565 | Holly et al. | June 24, 1958 |

OTHER REFERENCES

Stammer et al.: J. Am. Chem. Soc., vol. 77, pp. 2346–7 (1955).